United States Patent Office 3,120,622
Patented Feb. 4, 1964

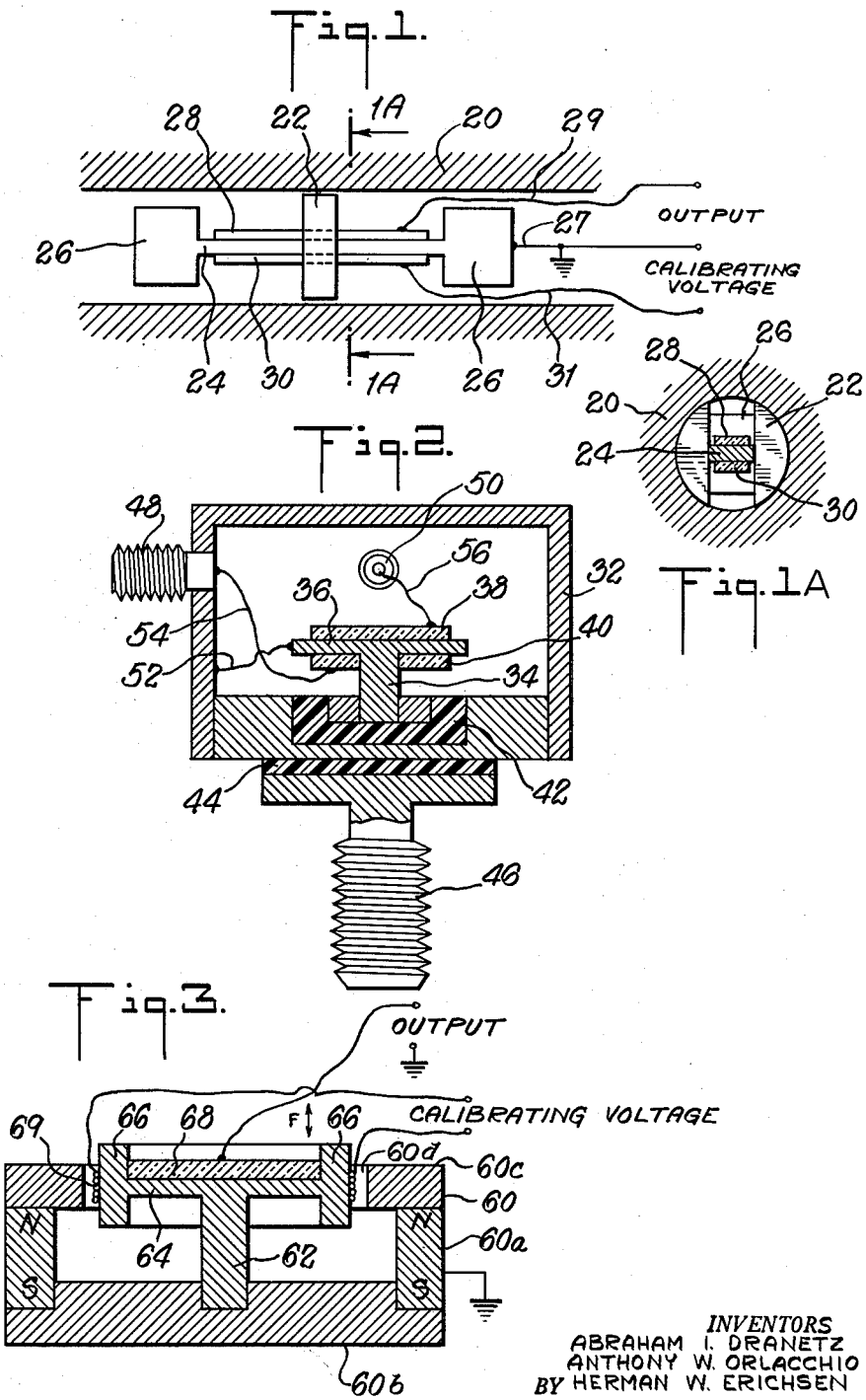

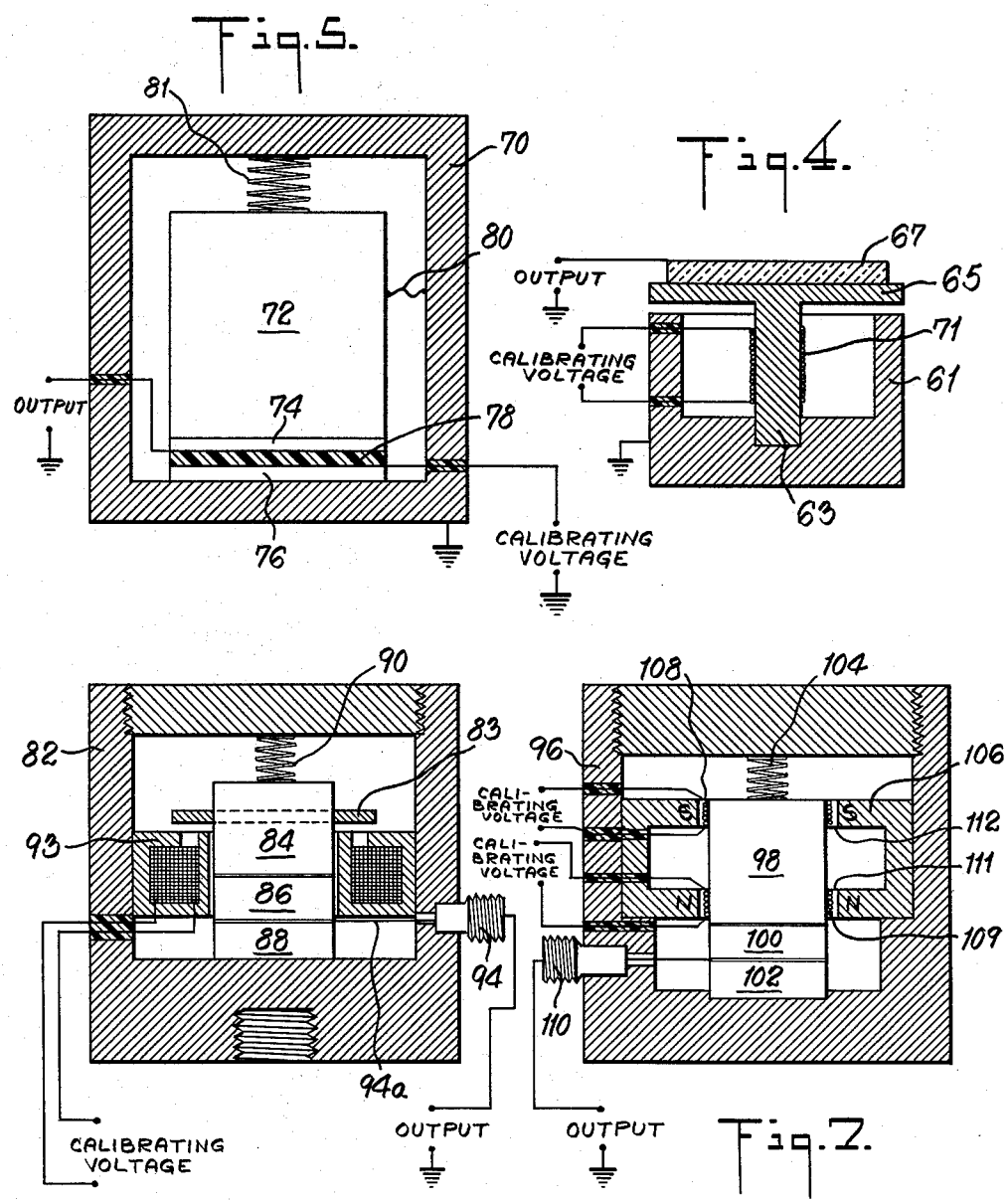

3,120,622
SELF-CALIBRATING ACCELEROMETER
Abraham I. Dranetz, Scotch Plains, Anthony W. Orlacchio, Fords, and Herman W. Erichsen, Nixon, N.J., assignors to Gulton Industries, Inc., Metuchen, N.J., a corporation of New Jersey
Filed Mar. 29, 1960, Ser. No. 18,307
12 Claims. (Cl. 310—8.4)

Our invention relates to self-calibrating accelerometers and in particular to those accelerometers wherein the user is able to calibrate the accelerometer output by applying a known input voltage to the device and measuring the output. More specifically, our invention is directed toward the check and calibration of an accelerometer in the field without the necessity of employing additional electromechanical measuring equipment.

Moreover, our invention is directed toward providing such a calibration system for accelerometers having piezosensitive materials as their active sensing or detecting elements. By the term "piezosensitive" material we mean one in which a mechanical stress produces a detectable change in at least one of the electrical characteristics of the material.

Up to now, piezosensitive accelerometers have been calibrated by subjecting them to a known mechanical force or vibration such as may be obtained by mounting the accelerometer on a "shake table" or a ballistic pendulum. There has been no simple, economical method of calibrating or checking the operation of an accelerometer by applying a known voltage to a self-contained calibration system and measuring the output as a function of the input voltage. This procedure simulates an equivalent mechanical acceleration. While we are not proposing that devices made in accordance with the teachings of our invention may be used for primary calibration of the accelerometer, they can be used for secondary calibration in conjunction with a shake table or ballistic pendulum and for checking the accelerometer immediately before flight takeoff or other use.

Accordingly, it is an important object of our invention to provide an accelerometer having a calibration and check system contained as an integral element of the accelerometer.

It is a further object of our invention to provide such an accelerometer wherein the active detecting element is formed of a piezosensitive material.

It is a still further object of our invention to provide such an accelerometer wherein the active calibration element is formed of a piezoelectric material.

It is a still further object of our invention to provide such an accelerometer wherein the active calibration element comprises an electromagnetic coil and the active detecting element is mounted on a magnetic material located in the field of the electromagnetic coil.

These and other objects, features, used and advantages will be apparent during the course of the following description when taken in connection with the accompanying drawings wherein:

FIGURE 1 is an elevational view, partly in section, of an accelerometer of our invention using a piezoelectric ceramic bender as the calibrating element, FIGURE 1A is a cross-sectional view of the embodiment of FIGURE 1 taken on lines 1A—1A of FIGURE 1, FIGURE 2 is a cross-sectional view of an accelerometer of our invention using a mushroom type piezoelectric ceramic sensing element and a flat piezoelectric ceramic ring as the calibrating element, FIGURE 3 is a cross-sectional view of an accelerometer of our invention using a mushroom type piezoelectric ceramic sensing element mounted on a magnetic plate and an electromagnetic coil in a permanent magnetic field as the calibrating element, FIGURE 4 is a cross-sectional view of an accelerometer of our invention using a piezoelectric ceramic sensing element mounted on mushroom type seismic armature of magnetic material which is part of the electromagnetic circuit which is used as the calibrating element, FIGURE 5 is a diagrammatic view, partly in cross-section, of an accelerometer of our invention using a pair of compression type piezoelectric ceramic sensing elements and a compression type piezoelectric ceramic calibrating element, FIGURE 6 is a cross-sectional view of an accelerometer of our invention using a pair of compression type piezoelectric sensing elements, a mass of magnetic material and an electromagnetic coil as the calibrating element, and FIGURE 7 is a cross-sectional view of a compression type accelerometer using a permanent magnet affixed to the housing and two calibrating electromagnetic coils.

It should be noted that the invention is directed toward providing devices which may be used, with associated electrical circuits, for calibrating accelerometers which use piezosensitive ceramic elements as the active sensing or detecting element. Mounting and other structural details of these types of accelerometers which are well-known and have been used in the art have not been redescribed in this application. It is therefore understood that, where applicable, the calibrating devices of our invention may be used interchangeably on the several embodiments shown and described in the application. We have reference, more specifically, to the fact that similar calibration techniques may be used for both the grounded and ungrounded types of accelerometers and for both the mass-loaded and unloaded types of mushroom type accelerometers.

While we have chosen to illustrate our invention in various forms in which the active detecting or sensing element is a piezoelectric ceramic such as the ferroelectric ceramics (barium titanate, lead titanate-zirconate, and other similar materials), other piezosensitive materials may also be used such as the piezoresistive materials (whose resistance changes in accordance with applied mechanical stress) or any other material one of whose electrical characteristics changes upon application of a mechanical stress. Moreover, we have not shown the electrodes applied to the piezosensitive elements but it is understood that the necessary electrodes are applied to the elements in a manner which is well-known in the art.

In FIGURES 1 and 1A there is shown a typical bender type accelerometer having a housing (or frame) 20, center support 22 affixed to housing 20 and armature 24 of piezoelectrically inert material such as steel, brass, etc. Affixed to armature 24 are mass loads 26. On one surface of armature 24, there is affixed sensing element 28 and on the opposite surface is affixed calibrating element 30. Both elements 28 and 30 are piezosensitive and in the particular embodiment illustrated, they are piezoelectric ceramics formed of one of the ferroelectrics. Electrodes (not shown) are applied to both the upper and lower surfaces of elements 28 and 30 so that electrical connection may be made to both surfaces of each of the elements. The surfaces of the negatively polarized side of both elements are in contact with armature 24 thus providing electrical contact with the armature which in turn is connected to housing 20 and electrical lead 27. The high side of element 28 is connected to electrical lead 29 and the high side of element 30 is connected to electrical lead 31. It should be noted that the calibrating element must be piezoelectric but the detecting element need not be piezoelectric.

The output of the accelerometer is taken off across the terminals marked Output which are connected to electrical leads 27 and 29. The calibrating voltage is applied to the terminals marked Calibrating Voltage which are connected to electrical leads 27 and 31.

For initial calibration of the accelerometer of FIGURE 1, the unit is placed on a shake table or ballistic pendulum and its electrical output is plotted against the mechanical acceleration to which it is subjected. After removal of the applied mechanical acceleration an electrical voltage is applied between terminals 27 and 31 and adjusted to create an output voltage equal to that caused by mechanical acceleration. The application of this calibrating voltage to element 30 causes element 30 to expand or contract longitudinally. This causes armature 24 to flex which in turn causes mechanical strain of element 28. The strain of element 28 produces an output voltage which is taken off at the Output terimnals and measured in the usual manner. The calibrating voltage may be A.-C. or pulse, simulating the desired nature of the acceleration. For example, if the response to sinusoidal acceleration is desired as a function of the frequency of acceleration, the calibration voltage will be sinusoidal A.-C., and the frequency of the applied calibration voltage can be adjusted to cover the band of interest.

This calibration voltage technique is useful in several ways. During factory calibration of the instrument, the relationship between calibration voltage and applied acceleration to produce an equivalent output can be measured. A subsequent change in this relationship would indicate instrument sensitivity change or damage. Secondly, the user is able to determine the frequency response of the instrument and the presence of resonance effects by electrical means. Thirdly, one may determine the response of the instrument to acceleration pulses very rapidly and easily. We also obtain a relationship between the calibrating voltage and the acceleration in this manner.

It can be seen that accelerometers of our invention may be check calibrated without any difficulty while the accelerometer is in place on the unit under test. Such a procedure will prevent the use of an accelerometer that has been damaged. It should be noted that the detecting element and the calibrating element may be interchanged in position without departing from the teaching of the invention but the calibrating element must be piezoelectric even though the detecting element need not be.

The embodiment of FIGURES 1 and 1A may be modified so as to use an electromagnetic forcing coil for calibration in the same manner as is described for the embodiments of FIGURES 3, 4, 6 and 7. In such a case, armature 24 is formed of magnetic material and the electromagnetic forcing coil is wound longitudinally around armature 24 and is affixed to mass loads 26. Calibrating voltage is applied to the electromagnetic forcing coil.

In FIGURE 2, there is illustrated an ungrounded, mushroom type accelerometer using a sensing element of the ferroelectric ceramics. It is seen to comprise housing 32, piezoelectrically inert disk 36 which is mounted on piezoelectrically inert rod 34 and active piezosensitive ceramic detecting element 38 of piezoelectric ceramic material such as has been described in connection with the embodiment of FIGURE 1 and which is mounted on the upper surface of disk 36. Piezoelectrically inert disk 36 is positioned so its center is in line with the longitudinal axis of rod 34. Piezoelectric ceramic disk 40, of material such as has been previously described, is provided as the calibrating element and is a disk with a hole in its center. Disk 40 is mounted so that rod 34 fits through the hole in element 40. The positions of sensing element 38 and calibrating element 40 may be reversed if desired. Electrodes (details not shown) are applied to both surfaces of both elements 38 and 40 in the manner well-known in the art. The particular accelerometer illustrated in FIGURE 2 is of the ungrounded type, that is, the accelerometer housing 32 is electrically insulated from the device under test. This is accomplished by means of insulating ring 42 and insulating disk 44. The output of the accelerometer is taken from connector 50 whose center pin is connected to the high side of element 38 by electrical lead 56 and whose shell is connected to housing 32. Housing 32 is an electrical shield and is connected to piezoelectrically inert disk 36 by means of electrical lead 52. The surfaces of elements 38 and 40 which are in contact with disk 36 are electrically and mechanically connected to disk 36. Calibrating voltage is applied through connector 48 whose center pin is connected to the high side of element 40 and whose shell is connected to housing 32.

In operation, when the device is subjected to acceleration, rod 34 moves up and down and disk 36 flexes, thereby causing element 38 to undergo radial strain and produce an output voltage which is fed to the usual measuring equipment through connector 50. When check calibrating by means of element 40, calibrating voltage (A.-C. or pulse) is applied through connector 48. This calibrating voltage causes a radial strain in element 40 which in turn causes disk 36 to flex and disk 38 to become strained. The strain in disk 38 produces an output voltage which is measured as described above.

In FIGURE 3, we have illustrated an accelerometer which is similar to that of FIGURE 2. It is of the grounded type and has a mass ring affixed to the rim of the piezoelectrically inert disk. Housing 60 is at equipment ground potential as shown in the figure and rod 62 and piezoelectrically inert disk 64, which is formed of magnetic material, are electrically connected to frame 60. Mass ring 66, also formed of a magnetic material, is affixed to the periphery of disk 64. Piezosensitive ceramic element 68, of material such as has been described heretofore, is affixed to disk 64 so that the electrode affixed to its lower surface (details not shown) is in electrical and mechanical contact with disk 64. The electrode affixed to the upper surface of element 68 (details not shown) is connected to one of the output terminals as shown in the figure.

The frame 60 is comprised of base 60b of magnetic material, circular side 60a, which is a permanent magnet polarized in the axial direction, and toppiece 60c, also of magnetic material. The structure provides a cylindrical air gap 60d between mass ring 66 and toppiece 60c, across which a radially oriented magnetic field is created by the magnetic circuit of 60b, 60a, 60c, 66, and 62.

Output voltage is taken off across the terminals marked Output as shown in the figure or it may be taken off a connector as shown in FIGURE 2. Calibrating voltage is applied to the terminals marked Calibrating Voltage in the figure. Alternatively, a connector similar to those of FIGURE 2 may be used. When a calibrating voltage is applied, an electrical current is created in electromagnetic forcing coil 69 which is fastened firmly to the periphery of mass ring 66. This causes a force in the direction of the arrows labelled F in FIGURE 3 on ring 66 of the value $F=IBl$, where I is the current, B is the magnetic field intensity and l is the length of wire in the coil. The force F causes a bending of disk 64 and causes a radial strain in disk 68, producing an output voltage. Calibration voltage may be plotted against output as described heretofore.

The embodiment of FIGURE 4 is similar to that of FIGURE 3 in calibration. Housing 61 is formed of magnetic material. Rod 63 is affixed to housing 61 and electrically connected to it. Rod 63 is of magnetic material and is affixed to piezoelectrically inert disk 65 also of magnetic material. Piezosensitive ceramic disk 67, which is electroded on both surfaces (details not shown), is affixed to disk 65 so that the electrode in contact with disk 65 makes electrical contact therewith and through it and rod 63 to housing 61 (equipment ground). The output of the accelerometer is taken off at the terminals marked Output in the figure in the usual manner. Electromagnetic coil 71 is wound around rod 63 and calibrating voltage (A.-C., D.-C. or pulse) is applied to it through terminals marked Calibrating Voltage. Upon the application of calibrating voltage (current) to coil 71, a force is produced which causes plate 65 and element 67 to deflect. This force is proportional to $B^2$ where B is the magnetic field intensity developed in the air gap due to current through the coil. The flexing of element 67 causes it to produce an output which may be detected with conventional readout equipment.

FIGURE 5 is a diagrammatic drawing, partly in cross-section, of a compression type accelerometer having a housing 70, mass 72, spring 81, piezosensitive element 74 and piezoelectric calibration element 76 of material such as has been described heretofore. Elements 74 and 76 are separated by insulator 78. The output of sensing element 74 is taken off at the terminals marked Output in the figure.

Mass 72 and elements 74, 76 and 78 constitute the seismic system which is subjected to mechanical acceleration. The acceleration causes the mass to exert a force on element 74 causing it to expand and contract. This expansion and contraction produces an output at the output terminals which may be measured in the usual manner. The output ground is connected to the upper electrode of piezosensitive element 74 by means of electrical lead 80 which is connected between mass 72 and frame 70. To calibrate the accelerometer, calibrating voltage (A.-C. or pulse) is applied across the terminals marked Calibrating Voltage in the figure. This voltage causes the piezoelectric calibrating element 76 to expand and contract and thereby causes mass 72 to move. This movement of mass 72 causes element 74 to expand and contract and produces a measurable output at the Output terminals. The calibrating voltage may be plotted against output for use in check calibration and test procedures. Spring 81 is used to position mass 72 with respect to housing 70. The positions of the calibrating element and the sensing element may be reversed from that shown in the figure without adversely affecting the operation of the accelerometer.

In FIGURE 6, we have shown another embodiment of a compression type accelerometer. It comprises housing 82, mass 84 having outer ring 83, piezosensitive ceramic elements 86 and 88 and spring 90. The calibrating system comprises electromagnetic forcing coil 92 which is wound within circular magnetic ring 93. Ring 93 is held rigidly in housing 82 (and is not in contact with mass 84). Mass 84 may be formed completely of magnetic material or may be formed of nonmagnetic material with the outer ring 83 being a magnetic material. The output of piezosensitive elements 86 and 88 (electrode details, not shown) is connected to connector 94 by means of lead 94a from which connections are made to the usual measuring circuits.

Calibrating voltage (A.-C., D.-C. or pulse) is applied to coil 92 through the terminals marked Calibrating Voltage on the figure. Upon application of calibrating voltage to coil 92, the current in 92 causes a force F between mass ring 83 and magnetic ring 93 where $F \alpha B^2$; where B is the magnetic field intensity and is proportional to the current flowing in the calibration coil.

In FIGURE 7, we have shown a further modification of a compression type accelerometer utilizing the teaching of our invention. It comprises housing 96, mass 98, piezosensitive ceramic sensing elements 100 and 102 (electrode details, not shown), spring 104, magnet 106 and electromagnetic forcing, calibrating coils 108 and 109 fastened firmly to mass 98. The accelerometer operates in the same manner as has been described heretofore for the earlier described accelerometer. Mass 98 is formed of magnetic material or may be of nonmagnetic material with a magnetic outer element surrounding the inner core. Magnet 106 is cylindrical in shape and is fitted firmly to housing 96. Air gaps 111 and 112 are left between mass 98 and magnet 106 as shown in the figure. Within these gaps are placed two separate windings, constituting electromagnetic forcing coils 108 and 109. Both these coils are attached firmly to mass 98. Calibrating voltage (A.-C., D.-C. or pulse) may be applied to either coil at the pairs of terminals marked Calibrating Voltage so as to cause a force to act on the mass and produce an output from piezosensitive elements 100 and 102 through output connector 110. Under normal conditions either of the two coils 108 and 109 is sufficient for calibration check. The use of two coils provides the possibility of checking one against the other or provides forces double that possible when only one coil is used.

It is within the contemplation of our invention to provide a single calibrating voltage source with means for connecting voltage severally to either electromagnetic forcing coil and means for applying voltage jointly to both electromagnetic forcing coils such that the magnetic effects from both coils are additive.

While we have disclosed our invention in relation to specific examples and in specific embodiments, we do not wish to be limited thereto, for obvious modifications will occur to those skilled in the art without departing from the spirit and scope of our invention.

Having thus described our invention, we claim:

1. A self-calibrating accelerometer comprising a housing, a rod affixed within said housing, a piezoelectrically inert disk affixed at one surface thereof to said rod such that the center of said piezoelectrically inert disk is substantially in the line of the longitudinal axis of said rod, a piezosensitive disk affixed to one surface of said piezoelectrically inert disk, a piezoelectric disk affixed to the other surface of piezoelectrically inert disk, means for making electrical connection to said piezosensitive disk, means for making electrical connection to said piezoelectric disk, a source of voltage, said voltage being applied to said piezoelectric disk such that said piezoelectrically inert disk and said piezosensitive disk are flexed thereby.

2. A self-calibrating accelerometer comprising a housing, a rod affixed within said housing, a piezoelectrically inert disk of magnetic material affixed at one surface thereof to said rod such that the center of said piezoelectrically inert disk is substantially in the line of the longitudinal axis of said rod, a piezosensitive disk affixed to one of the surface of said piezoelectrically inert disk, means for making electrical connection to said piezosensitive disk, said housing being largely comprised of magnetic material and including a magnet as a portion thereof, a source of voltage, an electromagnetic forcing coil wound around the periphery of said piezoelectrically inert disk and firmly affixed thereto, means for connecting said source of voltage to said electromagnetic forcing coil, said voltage being applied to said electromagnetic forcing coil such that said piezoelectrically inert disk and said piezosensitive disk are flexed thereby.

3. A self-calibrating accelerometer comprising a housing of magnetic material, a rod of magnetic material affixed within said housing, a piezoelectrically inert disk affixed at one surface thereof to said rod such that the center of said piezoelectrically inert disk is substantially in the line of the longitudinal axis of said rod, a piezosensitive disk affixed to one of the surfaces of said piezoelectrically inert disk, means for making electrical connection to said piezosensitive disk, an electromagnetic forcing coil wound around a portion of said rod and affixed thereto, a source of voltage, means for connecting said source of voltage to said electromagnetic forcing coil, said voltage being applied to said electromagnetic forcing coil such that said piezoelectrically inert disk and said piezosensitive disk are fixed thereby.

4. A self-calibrating accelerometer comprising an acceleration-responsive mass member, an electromechanically sensitive piezosensitive body associated with said mass member and stressed thereby in accordance with mechanical accelerations applied to the accelerometer, means for making electrical connection to said piezosensitive body for producing a signal in accordance with the stressing of the piezosensitive body, an electromechanically sensitive piezoelectric body associated with said mass member for independently mechanically driving said mass member to stress said piezosensitive body, and means for making electrical connection to said piezoelectric body to apply known electrical signals thereto for calibrating the accelerometer.

5. A self-calibrating accelerometer comprising an acceleration-responsive flexing armature, an electromechanically sensitive piezosensitive body secured to said armature and stressed by the flexing of the armature in accordance with mechanical accelerations applied to the accelerometer, means for making electrical connection to said piezosensitive body for producing a signal in accordance with the stressing of the piezosensitive body, electromechanically sensitive driving means associated with said armature for independently mechanically flexing said armature to stress said piezosensitive body, and means for making electrical connection to said electromechanically sensitive driving means to apply known electrical signals thereto for calibrating the accelerometer.

6. A self-calibrating accelerometer comprising an acceleration-responsive flexing armature, an electromechanically sensitive piezosensitive body secured to said armature and stressed by the flexing of the armature in accordance with mechanical accelerations applied to the accelerometer, means for making electrical connection to said piezosensitive body for producing a signal in accordance with the stressing of the piezosensitive body, an electromechanically sensitive piezo-electric body secured to said armature for independently mechanically flexing said armature to stress said piezosensitive body, and means for making electrical connection to said piezoelectric body to apply known electrical signals thereto for calibrating the accelerometer.

7. A self-calibrating accelerometer comprising an acceleration-responsive flexing armature, an electromechanically sensitive piezosensitive body secured to said armature and stressed by the flexing of the armature in accordance with mechanical accelerations applied to the accelerometer, means for making electrical connection to said piezosensitive body for producing a signal in accordance with the stressing of the piezosensitive body, electromagnetic driving means associated with said armature for independently mechanically flexing said armature to stress said piezosensitive body, and means for making electrical connection to said electromagnetic driving means to apply known electrical signals thereto for calibrating the accelerometer.

8. A self-calibrating accelerometer comprising an acceleration-responsive center-mounted flexing armature which is flexed about its center by mechanical accelerations applied thereto, an electromechanically sensitive piezosensitive body secured to said armature and stressed by the flexing of the armature in accordance with the mechanical accelerations applied to the accelerometer, means for making electrical connection to said piezosensitive body for producing a signal in accordance with the stressing of the piezosensitive body, electromechanically sensitive driving means associated with said armature for independently mechanically flexing said armature to stress said piezosensitive body, and means for making electrical connection to said electromechanically sensitive driving means to apply known electrical signals thereto for calibrating the accelerometer.

9. A self-calibrating accelerometer comprising an acceleration-responsive center-mounted flexing armature which is flexed about its center by mechanical accelerations applied thereto, an electromechanically sensitive piezosensitive body secured to said armature and stressed by the flexing of the armature in accordance with the mechanical accelerations applied to the accelerometer, means for making electrical connection to said piezosensitive body for producing a signal in accordance with the stressing of the piezosensitive body, an electromechanically sensitive piezoelectric body secured to said armature for independently mechanically flexing said armature to stress said piezosensitive body, and means for making electrical connection to said piezoelectric body to apply known electrical signals thereto for calibrating the accelerometer.

10. A self-calibrating accelerometer comprising an acceleration-responsive center-mounted flexing armature which is flexed about its center by mechanical accelerations applied thereto, an electromechanically sensitive piezosensitive body secured to said armature and stressed by the flexing of the armature in accordance with the mechanical accelerations applied to the accelerometer, means for making electrical connection to said piezosensitive body for producing a signal in accordance with the stressing of the piezosensitive body, electromagnetic driving means associated with said armature for independently mechanically flexing said armature to stress said piezosensitive body, and means for making electrical connection to said electromagnetic driving means to apply known electrical signals thereto for calibrating the accelerometer.

11. A self-calibrating accelerometer comprising an elongated armature having masses at its ends, mounting means secured to the center of the armature for stressing the armature about its center by mechanical accelerations applied thereto, an electromechanically sensitive piezosensitive body secured to said armature and stressed by the flexing of the armature in accordance with the mechanical accelerations applied to the accelerometer, means for making electrical connection to said piezosensitive body for producing a signal in accordance with the stressing of the piezosensitive body, an electromechanically sensitive piezoelectric body secured to said armature for independently mechanically flexing said armature to stress said piezosensitive body, and means for making electrical connection to said piezoelectric body to apply known electrical signals thereto for calibrating the accelerometer.

12. A self-calibrating accelerometer comprising a disc shaped armature, mounting means secured to the center of the armature for stressing the armature about its center by mechanical accelerations applied thereto, an electromechanically sensitive piezosensitive body secured to said armature and stressed by the flexing of the armature in accordance with the mechanical accelerations applied to the accelerometer, means for making electrical connection to said piezosensitive body for producing a signal in accordance with the stressing of the piezosensitive body, an electromechanically sensitive piezoelectric body secured to said armature for independently mechanically flexing said armature to stress said piezosensitive body, and means for making electrical connection to said piezoelectric body to apply known electrical signals thereto for calibrating the accelerometer.

References Cited in the file of this patent

UNITED STATES PATENTS

| 2,185,966 | Pfanstiehl | Jan. 2, 1940 |
| 2,661,622 | Severs | Dec. 8, 1953 |
| 2,714,672 | Wright et al. | Aug. 2, 1955 |
| 2,808,522 | Dranetz | Oct. 1, 1957 |
| 2,849,629 | Kissinger | Aug. 26, 1958 |
| 2,923,904 | Hieber | Feb. 2, 1960 |

FOREIGN PATENTS

| 104,704 | Sweden | June 9, 1942 |